United States Patent [19]

Cheng et al.

[11] Patent Number: 4,717,708
[45] Date of Patent: Jan. 5, 1988

[54] INORGANIC OXIDE AEROGELS AND THEIR PREPARATION

[75] Inventors: Chung-Ping Cheng, Mt. Kisco; Paul A. Iacobucci, Dobbs Ferry, both of N.Y.

[73] Assignee: Stauffer Chemical Company, Westport, Conn.

[21] Appl. No.: 565,937

[22] Filed: Dec. 27, 1983

[51] Int. Cl.$^4$ .......................... B01J 21/00; B01J 23/06
[52] U.S. Cl. ......................... 502/233; 502/235; 502/236; 502/343; 502/355
[58] Field of Search ............... 502/233, 234, 235, 236, 502/239, 343, 355

[56] References Cited

U.S. PATENT DOCUMENTS

| | | | |
|---|---|---|---|
| 2,456,576 | 12/1948 | Bodkin et al. | 502/235 |
| 2,469,733 | 5/1949 | Kearby | 502/235 |
| 3,673,111 | 6/1972 | Hovarth et al. | 502/213 |
| 4,436,883 | 3/1984 | Witt | 502/233 X |

FOREIGN PATENT DOCUMENTS 294681  1/1928  United Kingdom ............... 502/233

OTHER PUBLICATIONS

Preparation Of Silica Aerogel For Cherenkov Counters, by Poelz et al., (1982) pp. 491–503.

*Primary Examiner*—Carl F. Dees
*Attorney, Agent, or Firm*—Vivienne T. White

[57] ABSTRACT

The invention is directed to inorganic oxide aerogels and the method of preparing such inorganic oxide aerogels which are characterized by high surface areas and high pore volume. The preparation comprises dissolving the inorganic alkoxide or metal salt in a solvent optionally containing a catalytic amount of an acid or base and hydrolyzing to form a gelled or colloidal material which is further treated with a fluid at or above its critical temperature and pressure to extract the solvent which is then dried to remove surface water.

35 Claims, No Drawings

INORGANIC OXIDE AEROGELS AND THEIR PREPARATION

BACKGROUND OF THE INVENTION

1. Field of the Invention

The invention is directed to a method of preparing inorganic oxide aerogels and, in particular, inorganic oxide aerogels in the form of granular material characterized by high surface area and pore volume.

2. Relevant Art

Inorganic oxide aerogels, specifically metal oxide aerogels, are well known in the art as suitable for a variety of applications such as catalysts, catalyst supports, absorbents, chromatographic column packing, anticaking agents, viscosity enhancers, pigments, opacifiers, as well as ceramics, smoke suppressants, abrasives, dentifrice polishing agents and the like.

Examples of some known prior processes wherein the aerogels prepared in the manner disclosed are utilized as catalysts or catalyst supports are as absorbents in preparing solid phosphoric acid catalysts (as disclosed in U.S. Pat. No. 3,673,111); as a catalyst support for rhodium in the production of olefins and long chained hydrocarbons as is discussed in the Journal of Molecular Catalysis, Volume 17, pgs. 219-223 (1983); in the hydrocarbon synthesis from CO and $H_2$ disclosed in U.S. Pat. No. 4,273,724; in the Fischer-Tropsch synthesis described in Journal of Molecular Catalysis, Vol. 17 (1982), pgs. 171-181; as support for catalyst used in the manufacture of phthalic anhydride; and as a catalyst in the decomposition of hydrogen peroxide.

The preparation of aerogels, in general, and silica aerogels, in particular, has been well documented in the art. U.S. Patent Nos. 2,249,767, 3,672,833, 2,093,454 and 4,327,065 all disclose processes for producing aerogels. In addition, an article entitled *Inorganic Oxide Aerogels* appearing in Advances in Colloid and Interface Chemistry, Vol. 5, pages 245-273 (1976) published by Elsevier Scientific Publishing Co., Amsterdam, also describes methods of producing various aerogels.

It has been known to produce such aerogels by hydrolyzing salts, or alkoxides, in the presence or absence of a catalyst, generally an acid or base, to form a gel which is washed with water and then solvent exchanged with an alcohol prior to conventionally drying in an autoclave at the critical temperature and pressure of the solvent.

SUMMARY OF THE INVENTION

The invention is directed to a method of making substantially amorphous inorganic oxide aerogels characterized by high pore volume and surface area. The method comprises:

(a) hydrolyzing a compound comprising at least one metal dissolved in a solvent, to produce a gel;

(b) ageing the gel produced;

(c) contacting the aged gel in an autoclave with a fluid above the critical temperature and pressure of the fluid until extraction of the solvent by fluid has been completed; and (d) drying the inorganic oxide aerogel produced.

Preferably in the practice of the invention after step (c) the autoclave is depressurized at a rate necessary to maintain the temperature above the critical temperature of the fluid for the time necessary to prevent condensation.

The substantially amorphous, solid, dry, metal oxide product of the disclosed invention has a higher than normal surface area and pore volume.

DETAILED DESCRIPTION OF THE INVENTION

The instant invention is directed to obtaining substantially amorphous inorganic oxide aerogels characterized by high surface area and high pore volume, primarily metal oxide aerogels corresponding to metals of Groups II, III, IV, V, VI, VIIB and Group VIII of the Periodic Table of Elements and aerogels which are combinations of such metal oxides.

The invention's starting material is comprised of one or more inorganic metal alkoxides, or metal salts (hereinafter the term "inorganic alkoxides" covers salts unless otherwise specified) which are dissolved in a solvent and hydrolyzed by means of water, optionally with an added catalyst, to produce alcogels and then solvent exchanged in an autoclave with a fluid above the critical temperature and pressure of the fluid to produce aerogels. For instance, aerogel compositions such as $TiO_2/SiO_2$; $Al_2O_3/SiO_2$; $SiO_2$; $ZnO$; $ZnO/SiO_2$; and $ZrO_2/SiO_2$ can be produced using the method disclosed herein.

In the practice of the invention one or more inorganic metal alkoxides or salts thereof may be used as the starting material for preparing the aerogels. It is, however, preferred to utilize metal alkoxides.

Listed below are some of the compounds suitable for use in preparing the various aerogels mentioned:

Silica aerogels

Generally $C_1$-$C_5$ alkoxides such as tetramethyl silicate and tetraethyl silicates, and $SiCl_4$.

Zinc aerogels

Generally $C_1$-$C_5$ alkoxides as for instance di-isopropoxy zinc and chloride salts.

Zirconia-silica aerogels

Generally $C_1$-$C_5$ alkoxides such as tetra-isopropoxy zirconium, tetra sec butoxy zirconium, tetra-ethoxy zirconium; tetra-methyl silicate, tetra-ethyl silicate.

Alumina-silica aerogels $C_1$-$C_5$ alkoxides.

Titania-silica aerogels $C_1$-$C_5$ alkoxides.

Alumina aerogels $C_1$-$C_5$ alkoxides, and chloride salts of aluminum.

The criteria for the starting material are inorganic metal alkoxides or metal salts which will dissolve in the specified solvent. In any event, the starting material being dissolved will be an alkoxide since the salts of the metals used will be treated to produce the alkoxide prior to hydrolysis. Preparation of metal alkoxides is disclosed in *Metal Alkoxides* by Bradley, Mehrotra and Gaur, Academic Press (1978). This starting material is dissolved in an organic solvent, preferably an alcohol and most desirably $C_1$-$C_5$ alcohol or isomers thereof. In the practice of the invention it is preferable to utilize an alcohol which corresponds to the alcohol of the metal alkoxide being dissolved. Group IIA and B metals tend to form polymeric alkoxides which are insoluble in alcohols after isolation. In such instances it may be necessary to prepare the alkoxide in-situ with the alcohol.

The solvent utilized in the process should be a solvent for the inorganic alkoxide or alkoxides which are utilized; should be miscible in water and, optionally, the added hydrolysis catalyst; and should be soluble in the supercritical fluid. The amount of solvent utilized will determine the density of the finished aerogel.

The dissolved inorganic salt or alkoxide is hydrolyzed by the addition of at least a stoichiometric amount of water. The amount of water added in the process affects the pore size and surface area of the inorganic oxide aerogel formed. The water added should be sufficient to at least liberate the alkoxy groups from the alkoxide. Adding excess(over stoichiometric)amounts of water will accomplish the above.

The added amount of water should be sufficient to enable complete hydrolysis to take place. It is preferable to use deionized water in the practice of the invention to reduce the ion content in the formed gel. In certain applications, for instance wherein the aerogel is prepared for use as a catalyst or catalyst support, deionized water should be used in preparing the aerogel. The stoichiometrically requisite water amount may simply be calculated from the formula of the hydrolysis reaction. In general, the amount of water added should be from 1 to 10 times the stoichiometrically requisite amount, preferably from 1 to 5 times the stoichiometric amount. Too great an excess of water, however, can cause rapid hydrolysis thus resulting in shrinkage in the gel. Further, an overexcess is undesirable since such an excess may not be extracted by treatment with the supercritical fluid. The desirable amount of excess will also vary with the specific aerogel being produced.

The aerogels of the invention can be prepared in acidic, neutral or basic medium generally depending on the acidity or basicity of the metal oxide formed. Since the gel generally has a neutral pH, to enhance hydrolysis, a catalytic amount of an acid or base is desirably added in most instances. The addition of a catalytic amount of an acid or base during or simultaneous with the addition of the water affects the pore size and surface area of the product formed as indicated above. Although an acidic medium is generally preferred in preparing a number of inorganic oxide aerogels, the type of medium utilized generally depends on the specific inorganic oxide being produced. In the production of aluminum oxide aerogels, for instance, a neutral pH is preferred since an acid medium was found to cause a loss of pore volume. In the production of titanium oxide aerogels a basic medium causes the $TiO_2$ to precipitate as discrete fine particles with low surface area and pore volume.

The optional conditions for preparing a specific gel can be easily determined either from known prior art references or without much experimentation in accordance with the method disclosed herein.

Normally, the catalytic amount of the acid or base added in the process is less than 1% by total volume. The addition of excess acid or excess base increased the ions in the gel and such excess was found to impede the formation of the gel.

Any organic or inorganic acid or base can be utilized, as for instance, HCl, HF, acetic acid, $NH_3$, diethylamine, $HNO_3$ and $H_2SO_4$, all of which are suitable for use in practicing the invention. Certain acids or bases may, however, be more desirable for preparing specific inorganic oxides in the process of the invention. It is well within the knowledge of one skilled in the art to determine the more favorable conditions for producing the desired aerogel without undue experimentation.

An excess in acid or base may cause rapid precipitation of the gel which would also cause shrinkage in the gel or cause excess ions to remain in the final product which can be undesirable.

The hydrolysis of the alkoxide, or metal salt is generally conducted at room temperature. However, the hydrolysis can occur at temperatures of from about $-20°$ C. to about the boiling point of the solvent and preferably at temperatures of from about $-20°$ C. to about 30° C.

Generally in the process of the invention, the concentration of the inorganic alkoxide or metal salt should be from about 2% to about 50% (based on the total volume of the reactants utilized). Preferably the concentration should be from about 2% to about25%. At lower concentrations, gellation will not generally occur and at higher concentrations it is contemplated that a heavier gel will be formed having less pore volume and surface area. It is desirable to produce a gel having the least amount of solids using the most amount of solvent to achieve the highest surface area and pore volume possible.

Hydrolysis is conducted with cooling of the components where necessary either prior to or during the reaction proper. In the hydrolysis reaction an acid intermediate is formed and is hydrated and polymerized, with water liberated. In this manner, a number of small kernels are formed whose interior is constituted by amorphous inorganic oxide and whose outer surface displays organic alcohol groups. In due course the kernels are coupled by inorganic oxide linkages to form a space net. However, in the formation of this alcogel not all of the kernels have been coupled to each other and it is for this reason that the formed alcogel is allowed to age according to the invention. As a result of the ageing process, a more complete polymerization will be achieved, which results in better mechanical properties in the alcogel and, thereby, in the finished aerogel. According to the invention, the alcogel is aged for from 1 to 14 days depending on the specific inorganic oxide being prepared.

During the ageing process it may be necessary to add additional amounts of solvent to keep the alcogel wet. Prior to extracting the solvent, however, it is desirable to remove excess solvent from the alcogel to decrease the amount of solvent that must be extracted. This process step, while not a requirement of the process, is prudent to reduce processing time and energy requirements. Simply decanting the excess liquid is sufficient.

In the practice of the invention the various components (metal salt or inorganic alkoxide, water and optionally the catalytic amount of the acid or base) are charged to a reaction vessel in varying sequence dependent on the specific inorganic oxide aerogel being produced. Generally, the alkoxide, or metal salt thereof is initially dissolved in the mixture comprised of the solvent, water and acid or base. In some situations, however, it may be more desirous to slowly dissolve the alkoxide, or metal salt in the solvent prior to adding water and the specified amount of acid or base to form the gelled or colloidal material. As previously indicated, the structure of the gel can be altered by adjusting the pH of the solution.

The treatment of the alcogel for conversion to aerogel constitutes the second major step and is carried out, in practice, in an autoclave.

The solvent ladened gel or colloid which is formed in the practice of the invention is placed in an autoclave where it is contacted with a fluid above its critical temperature and pressure by allowing the supercritical fluid to flow through the material solid and liquid until the solvent is no longer being extracted by the supercritical fluid.

In performing the invention, various fluids can be utilized at their critical temperature and pressure. For instance, fluorochlorocarbons typified by Freon ® brand fluorochloromethanes and ethanes, ammonia, sulfur dioxide, nitrogen oxide and and carbon dioxide, are all suitable for use in practicing the invention. Carbon dioxide is the preferred critical fluid for the invention. The criteria for the extraction fluid is that it be inert to the metal oxide, dissolve the alcohol being removed and preferably have a low critical temperature, pressure, and toxicity, and be nonflammable.

During the extracting process in the autoclave the extraction fluid is constantly being recovered and replaced by clean fluid. The clean fluid can be fresh extraction fluid or recycled extraction fluid which has been treated to remove contaminants. The recovered fluid can be visually checked to determine whether the extraction process has been completed by allowing some of the exiting fluid to escape. If condensation occurs (alcohol) it indicates the need for further extraction, therefore, the extraction process has not been completed. After extraction is completed, optionally the solid is then further contacted with the fluid above the critical temperature and pressure for an additional period of time to insure complete removal of alcohol and substantially all water (only surface water remaining) after which the rate of depressurization of the autoclave is maintained to keep the temperature at or above the critical temperature of the supercritical fluid.

In some instances it may be necessary to wash the precipitated gel or colloid prior to treatment in the autoclave. The washing is generally necessary to remove free ions when the starting material is a metal salt. The washing also can be considered a solvent exchange where the solvent is exchanged for the water. In such instances the washing solvent must be soluble in the supercritical fluid at conditions near or above the critical temperature and pressure of the fluid. In such instances it is preferable to use the same solvent used to dissolve the alkoxide or metal salt.

The inorganic oxide aerogel after completion of the extraction process is dried at a temperature of from about 80° to about 100° C. to remove surface water from the final product since the extraction process does not remove all the water present.

The solid, dry, granular, inorganic oxide which remains after treatment in the manner disclosed herein exhibited a higher than normal surface area and pore volume. The density of the supercritrcal fluid used to extract the solvent and water when necessary should have a density corresponding to the density of the alcohol being removed thus causing the density gradient between the fluid and solvent to be substantially nil. Lowering the temperatures or increasing pressure will increase the density of the supercritical fluid, though the temperature must of course remain above the critical temperature of the fluid, preferably at T=1.1 Tc which is the minimum heat requirement that should be maintained. Tr(1.1) is the reduced temperature expressed as the absolute temperature over the critical temperature. By varying the temperature and pressure, therefore, it is possible to vary the pore size, pore volume and surface area of the aerogel produced.

The alkali metal ion content of the aerogel products produced in the manner disclosed is limited to that introduced as contaminants in the reactants used in the preparation. The sodium content of the silica aerogels produced, for instance, was found to be less than 100 ppm and in general ranged from 50 to 90 ppm and the sodium content of an alumina aerogel produced as disclosed was 269 ppm.

Although the inorganic oxide aerogel product of the invention is primarily obtained as a granular material, it is possible to obtain inorganic oxide aerogels in a monolith form. In such instances, however, the flow of the supercritical fluid should be extremely slow and the heat-up and cool-down time should be prolonged.

The following embodiments are provided as examples of preparing various aerogels in accordance with the invention and are not to be considered as limiting the scope of the present disclosure. It is contemplated that aerogels comprising more than one inorganic oxide having varying compositional ranges are within the scope of the invention.

EXAMPLE 1

Silica-titania aerogels (90 mole % silica)

The following ingredients were utilized to prepare a silica-titania aerogel in the manner described:
- 95.0 ml: Isopropanol (IPA)
- 32.4 ml: $H_2O$
- 60.3 ml: $Si(OC_2H_5)_4$
- 8.9 ml: $Ti(OC_3H_7)_4$
- 0.5 ml: HCl
- 1.0 ml: HF 95 ml of anhydrous isopropanol were placed in a beaker, with stirring, 60.3 ml $Si(OC_2H_5)_4$ and 8.9 ml $Ti(OC_3H_7)_4$ were added to the alcohol resulting in a clear solution. Thereafter, a solution comprised of 0.5 ml HCl (37%), 1.0 ml HF (48%), 32.4 ml deionized $H_2O$ was added to the stirring alkoxide/alcohol solution. A white solution resulted which turned to a white gel after ageing at 80° F. for 1.5 hours. After gelling, 25 ml IPA and 3 ml of deionized $H_2O$ were added to cover the gel. The gel was then allowed to age at room temperature for 5 days.

The gelled material was placed in a 1 liter autoclave. The autoclave was heated by an external heating source and simultaneously pressurized to attain conditions of 40° C. and 2500 psig ($1.75 \times 10^4$ KPa). When operating conditions were reached, $CO_2$ at these operating conditions was allowed to flow through the wet solid gel at 2 lbs/hr (0.91 Kg/hr). The process was maintained, and samples of extracted alcohol were taken every half hour. The process continued for 1 hour after the first dry sample (extractant). During this final hour of operation continuous stirring of the supercritical $CO_2$ and solid (dry gel) phase was maintained to enhance mass transfer and insure complete drying of the gel.

After 4.5 hours of continuous operation the flow of $CO_2$ was stopped, and the autoclave was slowly depressurized. During depressurization the autoclave temperature was maintained above 31° C. After completing depressurization (~15 minutes) the autoclave was found to contain a fluffy white powder.

The white powder was then placed in an oven at 80°–100° C. to remove surface water from the final product. Upon analysis the $SiO_2/TiO_2$ powder was shown to have a BET surface area of 872 $m^2$/gm. and an internal pore volume by Hg intrusion of 1.63 cc/gm.

EXAMPLE 2

Silica aerogel

The following ingredients were combined as follows:
191.2 ml: EtOH (ethanol)
133.8 ml: $Si(OC_2H_5)_4$
64.8 ml: $H_2O$ (deionized)
1.0 ml: 37 wt % aq HCl
2.0 ml: 48 wt % aq HF 191.2 ml of anhydrous ethanol was added to a beaker. While stirring, the other reactants were added to the ethanol in the amount and order indicated above. The clear homogeneous solution was allowed to set in a freezer at −20° C. (0° F.) for ∼18 hours (until gelled). After gellation enough ethanol was added to cover the gel's surface. The gel was then aged for 36 hours at −20° C.(0° F.) and then allowed to attain room temperature during a 24 hour period directly preceding extraction.

Excess ethanol was decanted from the clear gel, and the gel was broken into pieces and placed into a one-liter autoclave. The autoclave was heated by an external heating source and simultaneously pressurized to attain conditions of 40° C. and 4200 psig ($2.95 \times 10^4$ KPa). When operating conditions were reached, $CO_2$ at the specified operating conditions was allowed to flow through the wet solid gel at a rate of 1.1 lbs/hr (0.50 Kg/hr). Operation was maintained, and samples of extracted alcohol were taken every half hour. Operation continued for one hour after the first dry sample (extractant) was taken. During this final hour of operation continuous stirring of the supercritical $CO_2$ and solid (dry gel) phase was maintained to enhance mass transfer and insure complete drying of the gel.

After 7.75 hours of continuous operation the flow of $CO_2$ was stopped, and the autoclave was slowly depressurized. During the 15 minute depressurization the autoclave temperature was maintained above 31° C. After completing depressurization the autoclave was found to contain a mixture of chunks and small particles of a hazy white-blue material with an apparent bulk density of ∼0.10 g/cc.

The white-blue material was then placed in an oven at 80°–100° C. to remove surface water from the final product. Upon heating the material acquired a yellowish tint. Upon analysis the silica was found to be amorphous and have a BET surface area of 914 $m^2$/gm. and an internal pore volume by Hg intrusion of 2.54 cc/gm.

EXAMPLE 3

$TiO_2/SiO_2$ (95 mole % titania)

To a beaker was added 171.4 ml of anhydrous isopropanol (IPA) while stirring the following reactants were added to the IPA in the amount and order indicated:
19.3 ml: deionized $H_2O$
0.7 ml: 37% aqueous HCl
1.4 ml: 48% aqueous HF
3.5 ml: $Si(OC_2H_5)_4$ Finally, 100 ml of $Ti(OC_3H_7)_4$ was rapidly added to the mixing solution. This resulted in a gelled white solid which immediately resulted in a cessation of mixing. Afterwards 5 ml of deionized $H_2O$ in 45 ml of IPA was added to the gel. The gel was allowed to age at room temperature for 90 hours.

Excess IPA was decanted from the white gel and the gel placed into the one liter autoclave. The autoclave was heated by an external heating source and simultaneously pressurized to attain conditions of 40° C. and 4200 psig ($2.95 \times 10^4$ KPa). When operating conditions were reached, $CO_2$ at the specified operating conditions was allowed to flow through the wet solid gel at a rate of 1.313 lbs/hr (0.596 Kg/hr). Operation was maintained, and samples of extracted IPA were taken every half hour. Operation continued for one hour after the first dry sample (extractant) was taken. During this final hour of operation continuous stirring of the supercritical $CO_2$ and solid (dry gel) phase was maintained to enhance mass transfer and insure complete drying of the gel.

After 7.25 hours of continuous operation the flow of $CO_2$ was stopped, and the autoclave was slowly depressurized. During the 15 minute depressurization the autoclave temperature was maintained above 31° C. After completing depressurization the autoclave was found to contain a fluffy white powder with an apparent bulk density of 0.2 g/cc.

The white powder was then placed in an oven at 80°–100° C. to remove surface water from the final product. Upon analysis the titania was found to be amorphous and have a BET surface area of 668 $m^2$/gm. and an internal pore volume by Hg intrusion of 2.50 cc/gm.

EXAMPLE 4

Alumina aerogel 490 mls of anhydrous sec-butanol (sec-BuOH) was added to a 1000 ml beaker. With stirring 137.3 mls of aluminum-sec-butoxide ($Al(O\text{-sec-}C_4H_9)_3$) was added to the stirring alcohol to yield a homogeneous solution. Finally 30.27 mls of deionized water was added for hydrolysis. Addition of the aluminum alkoxide to alcohol resulted in a clear homogeneous solution which was allowed to stir for 3 minutes. The 30.27 mls of deionized $H_2O$ were rapidly added to the stirring alcoholic solution. The solution became opaque and discrete sols were noticed after ∼45 seconds. As the concentration of solids increased, stirring ceased. The sols continued to expand to a gel. The gel was covered with 95 mls of sec-BuOH plus 5 mls of deionized water and was allowed to age at room temperature for 41 hours.

Excess sec-BuOH was decanted from the gel, and the solvent laden gel was placed into a one liter autoclave. The autoclave was heated by an external heating source and simultaneously pressurized to attain conditions of 40° C. and 3500 psig ($2.46 \times 10^4$ KPa). When operating conditions were reached, $CO_2$ at the specified operating conditions was allowed to flow through the wet solid gel at a rate of 1.55 lbs/hr (0.7 Kg/hr). Operation was maintained, and samples of extracted alcohol were taken every half hour. Operation continued for one hour after the first dry extractant sample was recorded. During this final hour of operation continuous stirring of the supercritical $CO_2$ and solid (dry gel) phase was maintained to enhance mass transfer and insure complete drying of the gel.

After 8 hours of continuous operation the flow of $CO_2$ was stopped and the autoclave was slowly depressurized. During the 15 minute depressurization the autoclave temperature was maintained above 31° C. After completing depressurization the autoclave was found to contain a fluffy white powder having an apparent bulk density of ~0.09 g/cc.

The white powder was then placed in an oven at 80°–100° C. to remove surface water from the final product. Upon analysis of $Al_2O_3$ powder was shown to be amorphous and have a BET surface area of 645 $m^2$/g and an internal pore volume by Hg intrusion of 2.52 cc/g.

The aerogels prepared in accordance with the processes disclosed herein can be utilized as porous inert carrier material (support) in the polymerization and copolymerization processes wherein a catalyst is impregnated on the support. Such a process is disclosed in U.S. Pat. No. 4,379,759 to Goeke et al., incorporated herein by reference.

Various methods of impregnating the aerogel supports are known in the art. Two such methods are described in U.S. Pat. No. 4,379,759 at Col. 8, line 50 to Col. 10, line 5.

In preparing the polymerization catalysts disclosed in U.S. Pat. No. 4,379,759 the aerogel carrier material is dried by heating to a temperature of greater than 600° C. A precursor catalyst composition comprising a titanium compound and a magnesium compound is impregnated into the carrier material by dissolving the precursor compound in an electron donor compound and admixing the dissolved compound with the carrier or by adding the support to a solution of the chemical raw materials used to form the precursor compositions in an electron donor compound. Excess solvent or electron donor is removed by drying. Thereafter, the precursor compound is activated by dry blending outside the polymerization reactor the impregnated precursor composition with an activator compound at a temperature of <50° C. Another method of activation is by partially activating outside the polymerization reactor in a hydrocarbon solvent slurry followed by drying the resulting mixture to remove the solvent at from 20° C. to 80° C. and feeding the partially activated precursor composition to the polymerization reactor where activation is completed with additional activator compound.

Electron donors in the process are said to preferably be methyl formate, ethyl acetate, butyl acetate, ethyl ether, hexyl ether, tetrahydrofuran, dioxane, acetone and methyl isobutyl ketone. Preferable activating compounds are said to include $Al(C_2H_5)_2$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$; $Al(C_8H_{17})_3$, $Al(C_2H_5)_2H$ and $Al(C_2H_5)_2$-$(OC_2H_5)$. The instant invention is particularly useful in α olefin polymerization processes.

In addition to being used as supports for polymerization catalysts, the inorganic oxide aerogels of the present invention have a variety of uses as catalyst supports in numerous other chemical processes some of which were previously mentioned and are briefly described below.

In hydrogenation processes, as for instance the indirect liquefaction of coal, the Fischer-Tropsch process catalysts, such as nickel ruthenium, platinum, palladium, molybdenum, and rhodium are carried on a granular support lateral such as titanium oxide. The support can be impregnated with the required quantity of catalyst and air dried and reduced in a flow of $H_2$ at the desired temperature before use.

In gas phase isomerization, reforming processes, it is known to use molybdena-alumina catalysts or platinum or platinum-rhenium catalysts and other bi-metallic catalysts such as platinum-rhenium, and platinum-palladium. High surface area carrier material is impregnated with an aqueous solution containing the required amount of the salts of the catalytic metal or metals. The carrier is dried and reduced in hydrogen at an elevated temperature.

Gas phase oxidation processes such as the oxidation of naphthalene and xylenes to phthalic acids utilize catalytic carrier materials such as the inorganic oxide aerogels of the present invention. The desirable catalysts utilized in these processes are $V_2O_5$, $MoO_3$, Ag, Cu, PCl and $Bi_2O_3$.

An example utilizing a silica aerogel produced in accordance with Example 2 as a catalyst support is provided.

EXAMPLE 5

Silica produced in Example 2 was air-milled. Subsequent BET surface area was determined to be 920 $m^2$/gram. The air-milled silica was next calcined at 350° C. for 4 hours and then bottled and removed to a dry box.

2.3 grams of calcined silica was placed in a three-neck flask. Inlet and outlet ports were attached and a septum was used to close the center neck. The closed flask was then removed to the atmosphere. With an $N_2$ purge, 18.2 ml of anhydrous heptane was added to the silica. A slurry resulted. 0.86 ml of 25% TEAL* in heptane was next added to the slurry followed by another 1.28 ml heptane. The mixture was heated in an oil bath at 90° C. Another 8 mls of heptane were added to decrease the viscosity. Mixing continued always maintaining an $N_2$ atmosphere over the slurry. Agitation was stopped when viscosity became too great. Solvent was allowed to continue to evaporate yielding a fine white powder resembling the starting silica.

* triethyl aluminum

In a three-neck flask under $N_2$ purge 11.8 ml dried THF** and 0.58 grams of milled $MgCl_2$ were combined. With mixing 0.2 ml neat $TiCl_4$ was slowly added. This mixture was heated in an oil bath at 55° C. for ¼ hour.

** tetra hydrofuran

The $MgCl_2$/$TiCl_4$/THF solution was then added to the TEAL activated silica. 10 more ml of THF were added and 1 ml of $TiCl_4$ was slowly added to the resultant silica slurry.

The slurry was agitated and heated in a 55° C. oil bath for ¼ hour. During this time 5 ml of the THF were added to lower the slurry viscosity.

The slurry was then heated in a 90° C. oil bath with $N_2$ purge to remove the solvent. The solid was a free flowing tan colored material.

The solid gave an activity for ethylene polymerization of 10,458 gm. polymer/gm. catalyst and an activity for ethylene/butene copolymerization of 6886 gm. polymer/gm. catalyst.

The physical characteristics of some of the inorganic oxide aerogels prepared by the process disclosed herein are for instance as shown in Tables 1 and 2.

Table 2 sets forth the generic ranges for surface area and pore volume obtainable by the use of the present invention.

The crystal structure of the prepared metal oxide aerogels are substantially amorphous. By the term "substantially amorphous", it is meant that the aerogels are generally amorphous in structure except that the titania and titania containing aerogels were found to contain a minor amount of crystallinity.

TABLE 1
PARTICLE SIZE DISTRIBUTION OF SPECIFIC AEROGELS

| Silica | Alumina | Titania/Silica |
|---|---|---|
| As obtained from autoclave | | |
| 5 μm – 1 cm. | 2 μm – 200 μm | 1 μm – 200 μm |
| After air milling 1 min. | | |
| 0.84% + 150 μm | 21% + 212 μm | 4.2% + 212 μm |
| 3.48% + 125 μm | 75% + 150 μm | 20.0% + 150 μm |
| 45.28% + 75 μm | 95% + 75 μm | 31.3% + 125 μm |
| 86.74% + 45 μm | 100% + 45 μm | 80.6% + 75 μm |
| 100% + 5 μm | | 95.2% + 45 μm |
| | | 100% + 5 μm |

TABLE 2

| Aerogels | Surface Area(m$^2$/gm) (BET) | Pore Volume(cc/gm) (Hg intrusion) |
|---|---|---|
| Silica | 300–1100 | 0.32–4.5 |
| Alumina | 400–1000 | 2.0–8.0 |
| Titania | | |
| TiO$_2$/SiO$_2$ 95/5 | 300–1000 | 0.96–4.0 |
| SiO$_2$/TiO$_2$ 90/10 | 200–1000 | 1.5–3.5 |

What is claimed is:

1. A method of preparing inorganic oxide aerogels comprising:
   (a) hydrolyzing a compound comprising at least one metal dissolved in a solvent, to produce a gel;
   (b) ageing the gel produced;
   (c) contacting the aged gel in an autoclave with a fluid above the critical temperature and pressure of the fluid to extract the solvent; and
   (d) drying the gel.

2. The method of claim 1 further comprising depressurizing the vessel after step (c) at a rate necessary to maintain the temperature above the critical temperature of the fluid for the time necessary to prevent condensation and to obtain the solid dry aerogel.

3. The method of claim 1 wherein the metal is selected from Groups II to VI, Group VIIB and Group VIII of the Periodic Table of Elements.

4. The method of claim 3 wherein the metal is silicon.

5. The method of claim 3 wherein the metal is titanium.

6. The method of claim 3 wherein the metal is aluminum.

7. The method of claim 1 wherein the compound is an alkoxide

8. The method of claim 1 wherein the compound is a salt.

9. The method of claim 1 wherein the hydrolysis is conducted by the addition of a stoichiometric amount of water.

10. The method of claim 9 wherein the water added is from about 2 to about 10 times in excess of the stoichiometric amount.

11. The method of claim 10 wherein the water added is from about 2 to about 5 times in excess of stoichiometry.

12. The method of claim 1 wherein the hydrolysis is conducted in the presence of a catalyst.

13. The method of claim 12 wherein the catalyst is an acid.

14. The method of claim 12 wherein the catalyst is a base.

15. The method of claim 1 wherein the gel is aged from about 1 to about 14 days.

16. The method of claim 1 wherein the gel is washed prior to extraction.

17. The method of claim 16 wherein the gel is washed with a solvent.

18. The method of claim 17 wherein the solvent is a C$_1$ to C$_5$ alcohol.

19. The method of claim 1 wherein the extraction fluid has a low critical temperature and pressure.

20. The method of claim 19 wherein the fluid is CO$_2$.

21. The method of claim 1 wherein the solvent used to dissolve the metal containing compound is a C$_1$–C$_5$ alcohol.

22. The method of claim 21 wherein the alcohol is ethanol.

23. The method of claim 21 wherein the alcohol is isopropanol.

24. The method of claim 21 wherein the alcohol is sec-butanol.

25. The method of preparing inorganic oxide aerogels comprising hydrolyzing a metal alkoxide dissolved in a solvent to produce a gel, ageing the gel and contacting the aged gel in an autoclave with an extraction fluid at not less than the critical temperature and pressure of the extraction fluid such that the solvent is extracted and drying the gel to obtain the dried aerogel product.

26. A method of preparing inorganic oxide aerogels comprising hydrolyzing a metal containing compound dissolved in a solvent to produce a gel, ageing the gel and contacting the aged gel in an autoclave with an extraction fluid at not less than its critical temperature and pressure such that the solvent is extracted, drying the gel to obtain the dried aerogel product.

27. The methed of claim 26 further comprising depressurizing the vessel after extraction of the solvent at a rate necessary to maintain the temperature above the critical temperature of the fluid for the time necessary to prevent condensation and to obtain the solid dry aerogel.

28. An inorganic oxide aerogel product, produced by the method of claim 1.

29. An inorganic oxide aerogel produced by the method of claim 26.

30. The inorganic oxide aerogel of claim 28 wherein the product is silica.

31. The inorganic oxide aerogel of claim 28 wherein the product is alumina.

32. The inorganic oxide aerogel of claim 28 wherein the product is a zinc oxide aerogel.

33. The inorganic oxide aerogel of claim 28 wherein the product is a silica-titania complex.

34. The inorganic oxide aerogel of claim 28 wherein the product is a zirconia-silica complex.

35. The inorganic oxide aerogel of claim 28 wherein the product is a silica-alumina complex.

* * * * *

UNITED STATES PATENT AND TRADEMARK OFFICE
CERTIFICATE OF CORRECTION

PATENT NO. : 4,717,708
DATED : January 5, 1988
INVENTOR(S) : Chung-Ping Cheng - Paul Iacobucci It is certified that error appears in the above-identified patent and that said Letters Patent are hereby corrected as shown below:

Col. 5, line 15, delete "and" before "carbon dioxide"; and

Col. 9, line 47, change "Al($C_2H_5$)$_2$" to -- Al($C_2H_5$)$_3$ --.
(1st occurrence)

Signed and Sealed this

Ninth Day of August, 1988

Attest:

DONALD J. QUIGG

Attesting Officer

Commissioner of Patents and Trademarks